(12) United States Patent
Komich et al.

(10) Patent No.: US 12,142,273 B2
(45) Date of Patent: Nov. 12, 2024

(54) CREATION OF NOTES FOR ITEMS OF INTEREST MENTIONED IN AUDIO CONTENT

(71) Applicant: Honda Motor Co., Ltd., Tokyo (JP)

(72) Inventors: Matt Komich, Lyndhurst, OH (US); Rajeev Chhajer, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 267 days.

(21) Appl. No.: 17/522,501

(22) Filed: Nov. 9, 2021

(65) Prior Publication Data

US 2023/0142904 A1 May 11, 2023

(51) Int. Cl.

| | |
|---|---|
| *G10L 15/26* | (2006.01) |
| *B60W 40/08* | (2012.01) |
| *B60W 50/14* | (2020.01) |
| *B60W 60/00* | (2020.01) |
| *G06F 3/16* | (2006.01) |
| *G06F 16/951* | (2019.01) |
| *G06F 40/289* | (2020.01) |
| *G10L 15/16* | (2006.01) |
| *G10L 15/18* | (2013.01) |
| *G10L 15/22* | (2006.01) |
| *G10L 15/08* | (2006.01) |

(52) U.S. Cl.
CPC ............. *G10L 15/22* (2013.01); *B60W 40/08* (2013.01); *B60W 50/14* (2013.01); *B60W 60/0015* (2020.02); *G06F 3/165* (2013.01); *G06F 16/951* (2019.01); *G06F 40/289* (2020.01); *G10L 15/18* (2013.01); *B60W 2050/146* (2013.01); *B60W 2420/54* (2013.01); *G10L 2015/088* (2013.01); *G10L 2015/223* (2013.01)

(58) Field of Classification Search
CPC ..... G10L 15/22; G10L 5/26; G10L 2015/088; G10L 15/18; G10L 15/16; G06F 3/167; G06F 40/279; G06F 16/3344
See application file for complete search history.

(56) References Cited

U.S. PATENT DOCUMENTS

| | | | |
|---|---|---|---|
| 6,526,335 B1 * | 2/2003 | Treyz ................... | H04W 4/029 701/1 |
| 8,370,161 B2 * | 2/2013 | Mcclendon ....... | H04M 1/72403 709/224 |
| 9,262,766 B2 * | 2/2016 | Mason ............... | G06Q 30/0256 |
| 10,217,135 B2 | 2/2019 | Brown et al. | |

(Continued)

FOREIGN PATENT DOCUMENTS

EP 3070699 A1 9/2016

*Primary Examiner* — Olujimi A Adesanya
(74) *Attorney, Agent, or Firm* — Aaron Fong; American Honda Motor Co., Inc.

(57) ABSTRACT

A system and a method for creation of notes for items of interest mentioned in audio content is provided. The system detects a playback of audio content on a media device. The audio content includes a talk by a host or a conversation between the host and one or more persons. The system analyzes a portion of the audio content using a machine learning model and determines one or more items of interest that are mentioned in the talk or the conversation, based on the analysis. The system extracts information associated with the determined one or more items of interest from a web-based data source and controls the media device to display a user interface that includes the extracted information.

17 Claims, 7 Drawing Sheets

(56) References Cited

U.S. PATENT DOCUMENTS

| | | | |
|---|---|---|---|
| 10,580,043 B2 | 3/2020 | Publicover et al. | |
| 10,692,109 B1 | 6/2020 | Kolls | |
| 10,931,390 B2* | 2/2021 | Modi | H04W 4/44 |
| 10,945,012 B2 | 3/2021 | Schneck et al. | |
| 11,080,758 B2* | 8/2021 | Freeman | G06Q 30/0242 |
| 11,468,476 B1* | 10/2022 | Lundsgaard | H04N 21/23424 |
| 11,526,909 B1* | 12/2022 | Clepper | G06V 40/174 |
| 11,593,845 B1* | 2/2023 | Bork | G06Q 30/0277 |
| 2008/0005166 A1* | 1/2008 | Cragun | G06F 16/40 |
| 2009/0006375 A1* | 1/2009 | Lax | H04N 21/435 |
| | | | 707/999.005 |
| 2011/0078024 A1* | 3/2011 | Messier | G06Q 30/0266 |
| | | | 705/14.62 |
| 2011/0178878 A1 | 7/2011 | Ballout | |
| 2011/0213655 A1* | 9/2011 | Henkin | G06Q 30/00 |
| | | | 707/E17.061 |
| 2012/0215630 A1* | 8/2012 | Surendran | G06Q 30/0271 |
| | | | 705/14.49 |
| 2012/0290392 A1* | 11/2012 | Joshi | G06Q 30/02 |
| | | | 705/14.53 |
| 2012/0296745 A1* | 11/2012 | Harper | H04N 21/812 |
| | | | 705/14.64 |
| 2012/0303426 A1* | 11/2012 | Morad | G06Q 30/02 |
| | | | 705/14.4 |
| 2013/0030645 A1* | 1/2013 | Divine | B60K 35/00 |
| | | | 709/217 |
| 2013/0138508 A1* | 5/2013 | Gee | H04N 21/41422 |
| | | | 705/14.62 |
| 2014/0108155 A1* | 4/2014 | Johnson, Jr. | G06Q 20/405 |
| | | | 705/14.66 |
| 2014/0304228 A1* | 10/2014 | Palaniappan | G06F 16/9535 |
| | | | 707/634 |
| 2015/0199968 A1* | 7/2015 | Singhal | H04N 21/8405 |
| | | | 704/251 |
| 2015/0206181 A1* | 7/2015 | Parundekar | G06Q 30/0261 |
| | | | 705/14.49 |
| 2015/0370331 A1* | 12/2015 | Gonzales, Jr. | G06F 16/435 |
| | | | 345/156 |
| 2015/0370729 A1* | 12/2015 | Iyer | G06F 11/3055 |
| | | | 710/18 |
| 2015/0371364 A1* | 12/2015 | Park | G06F 3/1454 |
| | | | 345/428 |
| 2016/0306880 A1* | 10/2016 | Lv | H04H 60/33 |
| 2019/0050904 A1* | 2/2019 | Wasserman | G08G 1/0116 |
| 2019/0080356 A1 | 3/2019 | Han et al. | |
| 2019/0147875 A1* | 5/2019 | Stemmer | G10L 15/1815 |
| | | | 704/257 |
| 2019/0289360 A1* | 9/2019 | Choi | H04N 21/44 |
| 2019/0294668 A1* | 9/2019 | Goel | H04N 21/4788 |
| 2019/0332865 A1* | 10/2019 | Dassa | G06T 19/006 |
| 2020/0151770 A1 | 5/2020 | Knowles et al. | |
| 2020/0250696 A1 | 8/2020 | Cordell | |
| 2020/0288289 A1* | 9/2020 | Elnajjar | G06Q 30/0265 |
| 2020/0319845 A1 | 10/2020 | Shoop et al. | |
| 2022/0020376 A1* | 1/2022 | Garg | G06F 40/295 |
| 2022/0381580 A1* | 12/2022 | Shah | G01C 21/3691 |

* cited by examiner

CREATION OF NOTES FOR ITEMS OF INTEREST MENTIONED IN AUDIO CONTENT

BACKGROUND

Advancements in digital broadcasting technology have led to consumption of audio content in various formats and on various delivery platforms. For example, many people prefer to consume a live or pre-recorded audio that may be typically streamed or downloaded over internet. In comparison to a traditional radio broadcast, the users may have an option to pick and choose a specific audio program (for example, an episode or a talk show on mobility) that the users may want to listen to from a wide variety of audio content. A podcast is a type of audio content that is available online on the Internet and may have a series of episodes or parts. Usually, the podcast involves a talk by a host or a conversation between the host and one or more persons (such as a co-host and/or a guest). While listening to a podcast or any type of on-demand audio, a listener may want to note down or follow up with certain items that may have been mentioned within the playback duration and may be of interest to the listener. For example, the listener may be listening to the podcast while driving a vehicle, getting ready for work, exercising, running errands, cooking dinner, washing the dishes, and the like. In some instances, the listener may have screenless moments or may be engaged in a work that requires a lot of focus. In such instances, it may be difficult for the listener to keep track of and follow up with the items that may have been mentioned in the podcast.

Limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a system for creation of notes for items of interest mentioned in audio content is provided. The system may include circuitry that detects a playback of audio content on a media device. The audio content may include a talk by a host or a conversation between the host and one or more persons. The circuitry may analyze a portion of the audio content using a machine learning model based on the detection. The circuitry may determine one or more items of interest that may be mentioned in the talk or the conversation, based on the analysis. Thereafter, the circuitry may extract information associated with the determined one or more items of interest from a web-based data source and may control the media device to display a user interface that includes the extracted information.

According to another embodiment of the disclosure, a method for creation of notes for items of interest mentioned in audio content is provided. The method may include detecting a playback of audio content on a media device. The audio content may include a talk by a host or a conversation between the host and one or more persons. The method may further include analyzing a portion of the audio content using a machine learning model based on the detection and determining one or more items of interest that may be mentioned in the talk or the conversation, based on the analysis. The method may further include extracting information associated with the determined one or more items of interest from a web-based data source and controlling the media device to display a user interface that includes the extracted information.

According to another embodiment of the disclosure, a non-transitory computer-readable medium is provided. The non-transitory computer-readable medium may have stored thereon computer implemented instructions that, when executed by a system, causes the system to execute operations. The operations may include detecting a playback of audio content on a media device. The audio content may include a talk by a host or a conversation between the host and one or more persons. The operations may further include analyzing a portion of the audio content using a machine learning model, based on the detection and determining one or more items of interest that may be mentioned in the talk or the conversation, based on the analysis. The operations may further include extracting information associated with the determined one or more items of interest from a web-based data source and controlling the media device to display a user interface that includes the extracted information.

Figure 1:
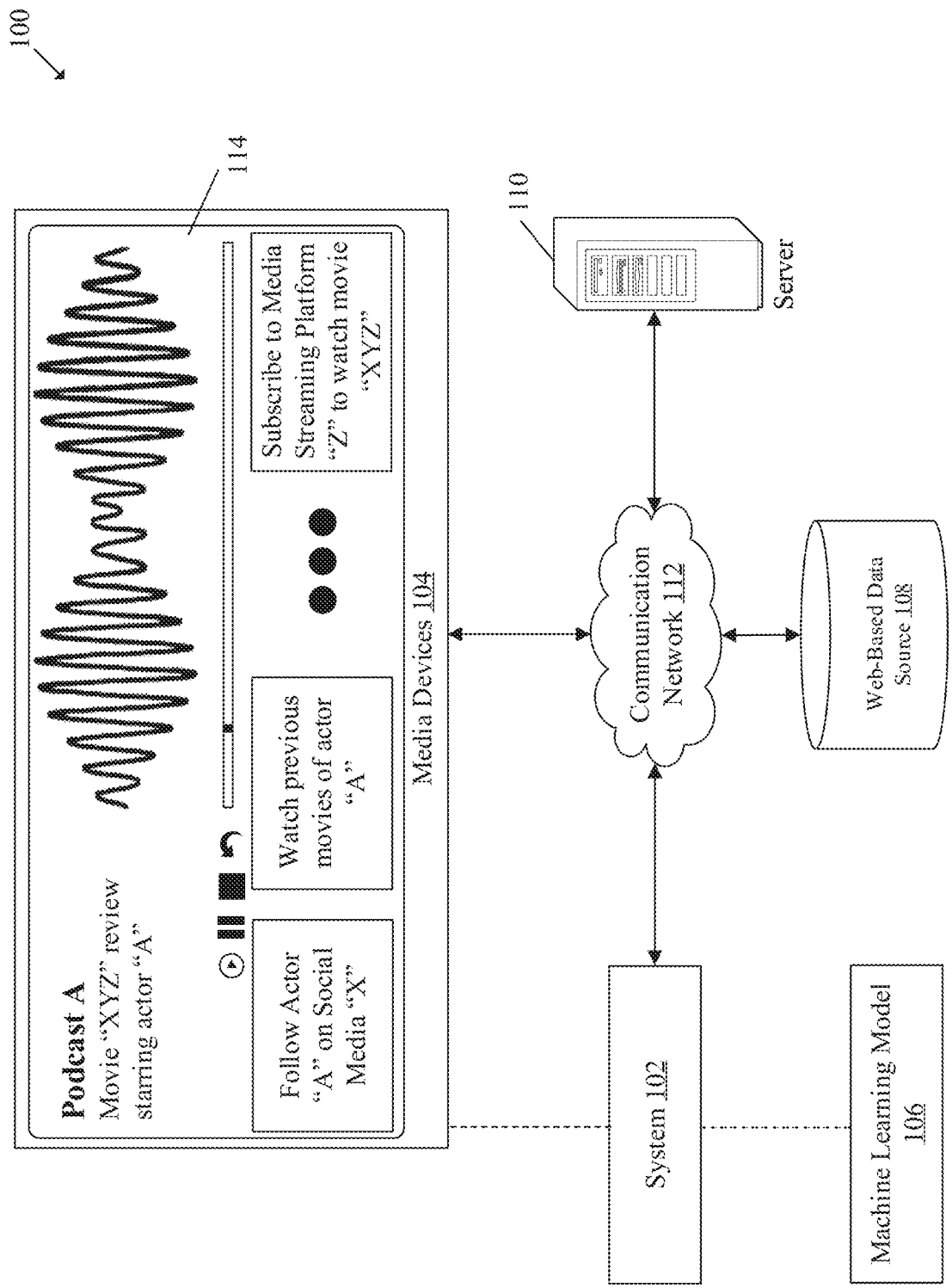
FIG. 1 is a block diagram that illustrates an exemplary network environment for creation of notes for items of interest mentioned in audio content, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed system for creation of notes for items of interest mentioned in audio content. Audio content such as a podcast typically includes a talk by a host or a conversation between the host and one or more persons, such as a cohost or a guest speaker. While listening to the podcast or any type of on-demand audio, a listener may want to note down or follow up with certain items that may have been mentioned within the playback duration and may be of interest to the listener. For example, the listener may be listening to the podcast while driving a vehicle, getting ready for work, exercising, running errands, cooking dinner, washing the dishes, and the like. In some instances, the listener may have screenless moments or may be engaged in a work that requires a lot of focus. In such instances, it may be difficult for the listener to keep track of and follow up with the items that may have been mentioned in the podcast. For example, the host or one or more guests may promote their products, services, or projects during the talk or the conversation. The listener may want to note down such items, i.e., products, services, or projects so that the listener can later read about, purchase, or talk about such items.

In some cases, the listener may be listening to the podcast while driving the vehicle. The listener may want to read about one or more items of interest that may be mentioned in the conversation. However, it may not be feasible for the listener to keep a mental note or a written note of all important items that may have been discussed in the talk or the conversation, while driving the vehicle. Therefore, there is a need for a system that automatically detects and identifies all items of interest that may be mentioned in a talk or conversation and later on provides a view of such items along with some information associated with such items.

Exemplary aspects of the disclosure may provide a system that may be configured to detect a playback of audio content, such as, but not limited to, an on-demand audio content, a live podcast or a pre-recorded podcast. The audio content may include a talk by a host or a conversation between the host and one or more persons, such as a cohost or a guest speaker. The system may analyze a portion of the audio content using a machine learning model (such as a natural language processing model), based on the detection. Thereafter, the system may determine one or more items of interest (such as an upcoming event or show, a product, a service, or a project) that may be mentioned in the talk or the conversation, based on the analysis. The system may extract information associated with the determined one or more items of interest from a web-based data source (such as a webpage or a fileserver) and may control a media device to display a user interface that includes the extracted information.

The disclosed system may be configured to automatically determine one or more items of interest from the audio content (such as the podcast). Specifically, the system may use the machine learning model to analyze the audio content and to further determine the one or more items of interest. The system may be further configured to extract information associated with each of the one or more items of interest and display each of the one or more items of interest along with the extracted information on a media device, such as an infotainment unit or a mobile device present inside the vehicle. This display of such items along with the extracted information may assist a user, who may be listening to the audio content, to keep track of all items of interest that may be mentioned in the audio content. The user may not have to keep a mental note or a written note of such items of interest. Also, the extracted information may save the effort of the user in looking up such items on the web for details or other kinds of interaction, such as a purchase or a subscription In some embodiments, the system may generate a note that includes a list of such items of interest and the extracted information. The generated note may be displayed to the first person only when the vehicle is in a safe state (such as in a parked state of the vehicle or a state in which the vehicle is idling at a location). Therefore, the disclosed system 102 may consider the safety of the user before delivering the generated note.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a block diagram that illustrates an exemplary network environment for creation of notes for items of interest mentioned in audio content, in accordance with an embodiment of the disclosure. With reference to FIG. 1, there is shown a network environment diagram 100 which may include a system 102. In FIG. 1, there is shown a media device 104. There is further shown a machine learning (ML) model 106, a web-based data source 108, and a server 110. In FIG. 1, there is also shown a communication network 112 and a user interface 114.

The system 102 may include suitable logic, circuitry, interfaces, and/or code that may be configured to determine one or more items of interest that may be mentioned in a talk or a conversation, included in the audio content. The system 102 may control the media device 104 to display the user interface 114 that includes information associated with such items of interest. Examples of the system 102 may include, but are not limited to, an in-vehicle infotainment device, a smartphone, a wearable electronic device (such as eXtended Reality (XR) headset, a headphone, a smartwatch, or a smart band), a personal computer, a vehicle computer, a television, a consumer electronic device, or a server. The server may be, for example, an advertisement server, a content server, a database server, a file server, a web server, a media server, an application server, a mainframe server, or a cloud computing server.

In accordance with an embodiment, the system 102 may be implemented as a cloud server and may execute operations through web applications, cloud applications, HTTP requests, repository operations, file transfer, and the like. In at least one embodiment, the system 102 may be implemented as a plurality of distributed cloud-based resources by use of several technologies that are well known to those ordinarily skilled in the art. In another embodiment, the system 102 may correspond to a mainframe machine, a computer workstation, and/or any device with an audio processing and networking capability. In accordance with an embodiment, the system 102 may include the media device 104 as a display unit that may be integrated into or peripherally connected to the system 102.

The media device 104 may include suitable logic, circuitry, and/or interfaces that may be configured to receive the audio content from a content source and play the audio content through one or more audio reproduction devices. The media device 104 may be further configured to render the user interface 114. In an embodiment, the media device may be placed inside a vehicle and may be one of an infotainment unit of the vehicle or an electronic device that may be associated with a user of the vehicle or a consumer of the audio content in the vehicle. Examples of the media device 104 may include, but are not limited to, an in-vehicle infotainment (IVI) system, an entertainment system, an automotive Head-up Display (HUD), an automotive dashboard, a human-machine interface (HMI), a navigation system, a vehicle user interface (UI) system, a vehicle music system, an Advanced Driver-Assistance System (ADAS), an Internet-enabled communication system, and other entertainment systems. Other examples of the media device 104 may include, but are not limited to, a smartphone, a mobile phone, a gaming device, a computing device, a laptop, a computer work-station, a mainframe machine, and/or a consumer electronic (CE) device.

The machine learning (ML) model 106 may be a natural language processing model that may be trained on a task of keyword detection and text classification. Additionally, or alternatively, the ML model 106 may be trained on a task of speech-to-text conversion and multi-speaker classification. In an embodiment, the system 102 may perform a set of operations on the audio content before the ML model 106 may be applied to detect keywords or key phrases from the audio content. Such operations may include, for example, a normalization and pre-emphasis operation, a framing operation, a transformation operation, and the like. In the normalization and pre-emphasis operation, the audio content may be passed through a high pass filter to reduce noise. In the framing operation, the audio content is further divided into one or more frames. In the transformation operation, the audio content may be further decomposed into a set of harmonics of different frequencies and amplitudes. The keywords may be detected based on the set of harmonics.

The ML model 106 may include electronic data, which may be implemented as, for example, a software component of an application executable on the system 102. The ML model 106 may rely on libraries, external scripts, or other logic/instructions for execution by a processing device, such as circuitry. The ML model 106 may include code and routines configured to enable a computing device, such as the system 102 to perform one or more operations, such as an analysis of a portion of the audio content. The analysis of the audio portion may include a conversion of the portion of the audio content to a text and a determination of one or more keywords or key phrases associated with one or more items of interest from the text. In accordance with an embodiment, the ML model may be implemented using hardware including a processor, a microprocessor (e.g., to perform or control performance of one or more operations), a field-programmable gate array (FPGA), or an application-specific integrated circuit (ASIC). Alternatively, in some embodiments, the ML model 106 may be implemented using a combination of hardware and software.

In accordance with an embodiment, the ML model 106 may be a deep neural network (DNN) or a hybrid network that uses one or more DNNs. The DNN may be a computational network or a system of artificial neurons, arranged in a plurality of layers, as nodes. The plurality of layers of the DNN may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the DNN. Outputs of each hidden layer may be coupled to inputs of at least one node in other layers of the DNN. Node(s) in the final layer may receive inputs from at least one hidden layer to output a result. The number of layers and the number of nodes in each layer may be determined from hyper-parameters of the DNN. Such hyper-parameters may be set before or after training the DNN on a training dataset.

Each node of the DNN may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the DNN. All or some of the nodes of the DNN may correspond to same or a different mathematical function.

In training of the DNN, one or more parameters of each node of the DNN may be updated based on whether an output of the final layer for a given input (from the training dataset) matches a correct result based on a loss function for the DNN. The above process may be repeated for same or a different input till a minima of loss function may be achieved and a training error may be minimized. Several methods for training are known in art, for example, gradient descent, stochastic gradient descent, batch gradient descent, gradient boost, meta-heuristics, and the like.

Examples of the ML model 106 may include, but are not limited to, an Artificial Neural Network (ANN)-Long Short Term Memory (LSTM) network (ANN-LSTM), a Convolutional Neural Network (CNN)-LSTM network, a CNN-Recurrent Neural Network (RNN), a Connectionist Temporal Classification (CTC) model, or a Hidden Markov Model.

The web-based data source 108 may include suitable logic, circuitry, and interfaces that may be configured to store information related to a plurality of items of interest. By way of example, and not limitation, the web-based data source 108 may include content in the form of webpages, web feeds (such as RSS feeds), data exposed by a search engine, pages of a web application, files hosted on a server, a web-based repository, or a data source on the web that may be linked to the system 102 via an API server. The content may include, for example, identifiers of an item of interest, a URL of a page or a website associated with the item of interest, a description of the item of interest, a price, a promocode, an executable code, a discount applicable on the item of interest, an event schedule associated with the item of interest, or a social media profile or post associated with the item of interest.

The server 110 may include suitable logic, circuitry, and interfaces, and/or code that may be configured to store the audio content and a textual description associated with audio content. The server 110 may be further configured to store and train the ML model 106. The server 110 may be implemented as a cloud server and may execute operations through web applications, cloud applications, HTTP requests, repository operations, file transfer, and the like. Other example implementations of the server 110 may include, but are not limited to, a database server, a file server, a web server, a media server, an application server, a mainframe server, or a cloud computing server.

In at least one embodiment, the server 110 may be implemented as a plurality of distributed cloud-based resources by use of several technologies that are well known to those ordinarily skilled in the art. A person with ordinary skill in the art will understand that the scope of the disclosure may not be limited to the implementation of the server 110 and the system 102 as two separate entities. In certain embodiments, the functionalities of the server 110 may be incorporated in its entirety or at least partially in the system 102, without a departure from the scope of the disclosure.

The communication network 112 may include a communication medium through which the system 102, the media device 104, and the web-based data source 108 may communicate with each other. The communication network 112 may include one of a wired connection or a wireless connection. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in FIG. 1 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the system 102 may detect a playback of audio content on the media device 104. In accordance with an embodiment, the media device 104 may be placed inside a vehicle and may be one of an infotainment unit of the vehicle or an electronic device associated with a user of the vehicle or a consumer of the audio content in the vehicle. The vehicle may be in one of a moving state, a parked state, or an idling state. In accordance with another embodiment, the media device 104 may be placed in any built environment, such as an office space, a living room, a bedroom, or a personal cabin.

The audio content may be one of an on-demand audio content, a live podcast, a pre-recorded podcast, or an audio of an on-demand or a live video program and may include a talk by a host or a conversation between the host and one or more persons, such as a co-host or a guest speaker. Based on the detection of the playback, the system 102 may analyze a portion of the audio content using the ML model 106. Details on the use of the ML model 106 are provided, for example, in FIG. 3A.

The system 102 may be further configured to determine one or more items of interest that may be mentioned in the talk or the conversation based on the analysis of the portion of the audio content. The one or more items of interest may include at least one of, but not limited to, an advertisement, a sponsored content, a product, a service, or a project that is mentioned in the talk or the conversation, a knowledge base article, an upcoming event or show, a focus or title of an upcoming episode of a podcast, a social network identifier, a website, or a concept that may be relevant to a topic of the talk or the conversation. Details and examples of the one or more items of interest are provided, for example, in FIGS. 3A and 4A.

After the items of interest may be determined, the system 102 may extract information associated with the determined one or more items of interest from the web-based data source 108. By way of example, and not limitation, the extracted information may include at least one of an identifier of each of the one or more items of interest, a URL of a page or a website associated with each of the one or more items of interest, a description of each of the one or more items of interest, a price, a promocode, or a discount applicable on the one or more items of interest, an event schedule associated with the one or more items of interest, or a social media profile or post associated with the one or more items of interest.

The system 102 may be further configured to control the media device 104 to display the user interface 114 on the media device 104. The displayed user interface 114 may include the extracted information about the one or more items of interest. In an embodiment, the system 102 may generate a call-to-action (CTA) item based on the extracted information and may control the media device 104 to display the CTA item onto the user interface 114. Details about the CTA item are provided, for example, in FIGS. 3A, 3B, 4A, and 4B.

Figure 2:
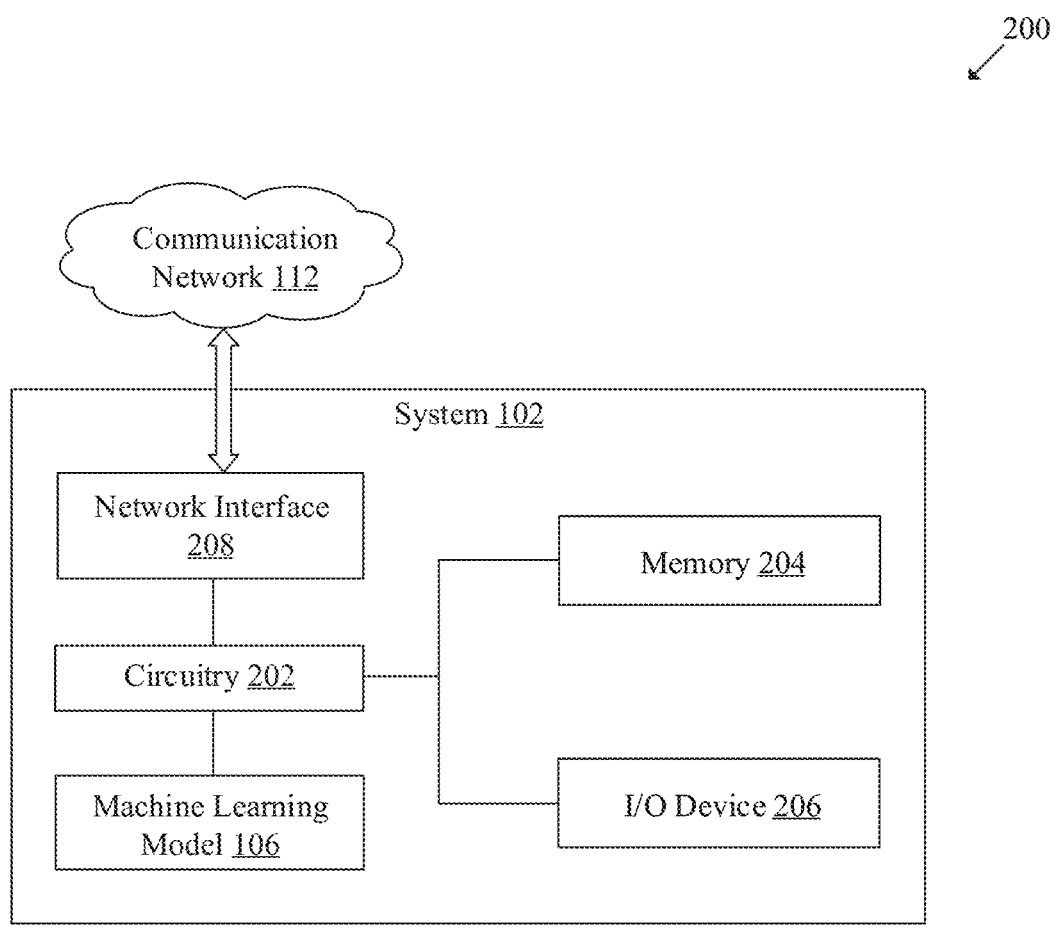
FIG. 2 is a block diagram that illustrates an exemplary system for creation of notes for items of interest mentioned in audio content, in accordance with an embodiment of the disclosure.

FIG. 2 is a block diagram that illustrates an exemplary system for creation of notes for items of interest mentioned in audio content, in accordance with an embodiment of the disclosure. FIG. 2 is explained in conjunction with elements from FIG. 1. With reference to FIG. 2, there is shown a block diagram 200 of the system 102. The system 102 may include circuitry 202, a memory 204, an input/output (I/O) device 206, a network interface 208, and a ML model 106. The circuitry 202 may be communicatively coupled to the memory 204, the I/O device 206, and the network interface 208 through wired or wireless connections. In FIG. 2 the system 102 is shown to include the circuitry 202, the memory 204, the I/O device 206, the network interface 208. and, the ML model 106, However, the disclosure may not be so limiting and in some embodiments, the system 102 may include more or less components to perform the same or other functions of the system 102. Details of the other functions or the components have been omitted from the disclosure for the sake of brevity.

The circuitry 202 may include suitable logic, circuitry, and/or interfaces code that may be configured to execute a set of operations of the system 102. The set of operations may include, but are not limited to, detection of the playback of the audio content, analysis of the portion of the audio content, determination of one or more items of interest, extraction of the information, and controlling the media device 104 to display the user interface 114. The circuitry 202 may include any suitable special-purpose or general-purpose computer, computing entity, or processing device including various computer hardware or software modules and may be configured to execute instructions stored on any applicable computer-readable storage media. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors configured to, individually or collectively, perform or direct performance of any number of operations of the system 102, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store a set of instructions executable by the circuitry 202. The memory 204 may be configured to store the detected audio content, determined one or more items of interest, extracted information and the textual description associated with the audio content. The memory 204 may be further configured to store a web crawler script, determined capability of an electronic device, and generated note. In an embodiment, the memory 204 may further store the ML model 106. Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to may receive inputs and provide output (such as, the extracted information and the generated first CTA item). The I/O device 206 may include one or more input and output devices that may communicate with different components of the system 102. Examples of the I/O device 206 may include, but are not limited to, a touch screen, a keyboard, a mouse, a joystick, a microphone, a speaker, and a display device.

The network interface 208 may include suitable logic, circuitry, and interfaces that may be configured to facilitate communication between the circuitry 202, the media device 104, the web-based data source 108, and the server 110 via the communication network 112. The network interface 208 may be implemented by use of various known technologies to support wired or wireless communication of the system 102 with the communication network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Figure 3A:
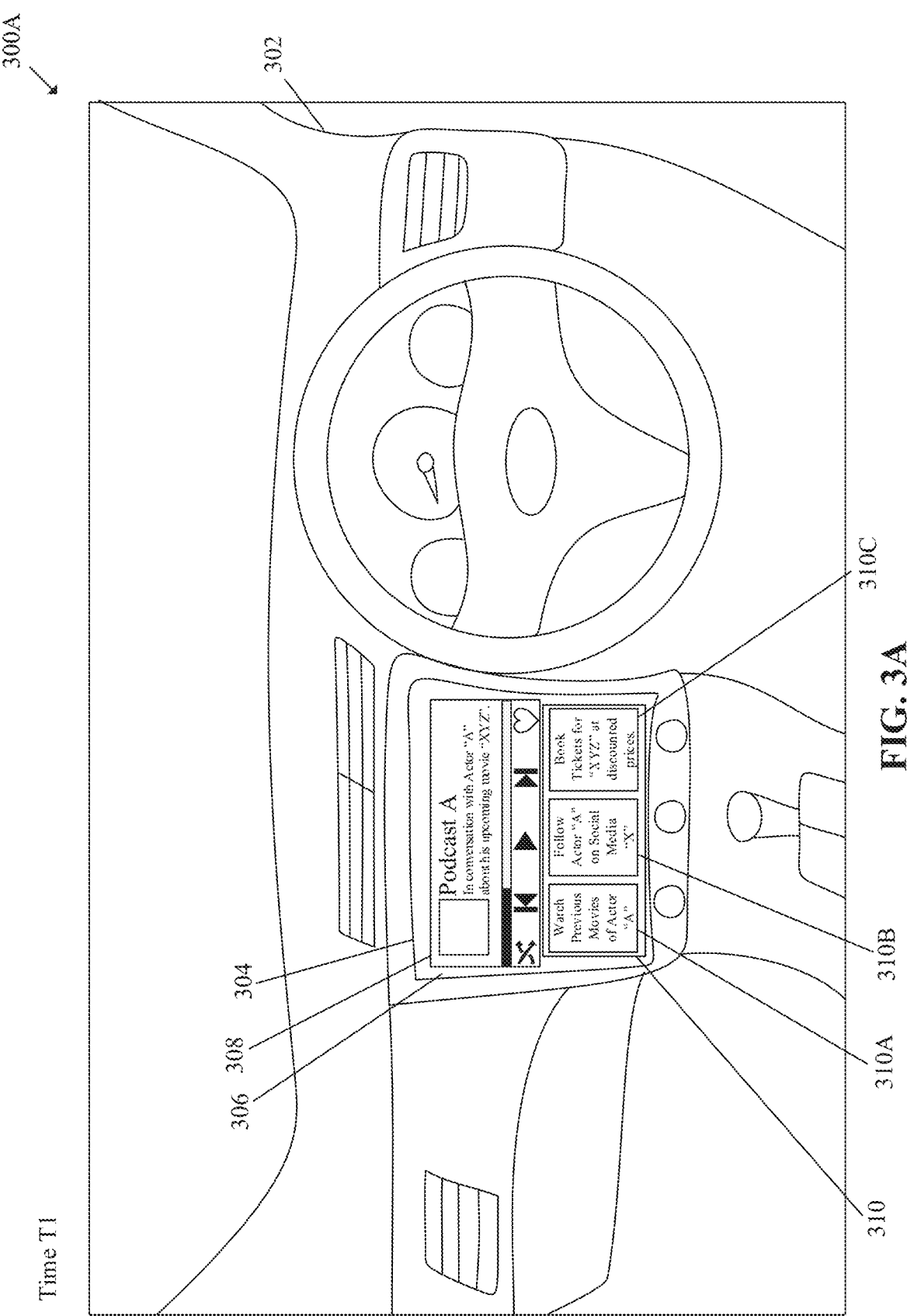
FIG. 3A is a diagram that illustrates an exemplary scenario for creation of notes for items of interest mentioned in audio content, in accordance with an embodiment of the disclosure.

FIG. 3A is a diagram that illustrates an exemplary scenario for creation of notes for items of interest mentioned in audio content, in accordance with an embodiment of the disclosure. FIG. 3A is explained in conjunction with elements from FIG. 1 and FIG. 2. With reference to FIG. 3A, there is shown an exemplary scenario 300A of a vehicle 302 that includes an infotainment unit 304. The infotainment unit 304 may be an exemplary implementation of the media device 104. There is further shown a user interface 306 that may be displayed on the media device 104.

The vehicle 302 may be a non-autonomous vehicle, a semi-autonomous vehicle, or a fully autonomous vehicle, for example, as defined by Society of Automotive Engineers (SAE) automation levels. Examples of the vehicle 302 may include, but are not limited to, a two-wheeler vehicle, a three-wheeler vehicle, a four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources.

The vehicle 302 may be a system through which the rider may travel from a start point to a destination point. Examples of the two-wheeler vehicle may include, but are not limited to, an electric two-wheeler, an internal combustion engine (ICE)-based two-wheeler, or a hybrid two-wheeler. Similarly, examples of the four-wheeler vehicle may include, but are not limited to, an electric car, an internal combustion engine (ICE)-based car, a fuel-cell based car, a solar powered-car, or a hybrid car. It should be noted here that the interior of a four-wheeler vehicle in FIG. 3A is merely shown as an example and such an example should not be construed as limiting the disclosure. The present disclosure may be applicable to other types of vehicles. The description of other types of the vehicle has been omitted from the disclosure for the sake of brevity.

The infotainment unit 304 may include suitable logic, circuitry, interfaces and/or code that may be configured to render audio content or video content by use of the user interface 306 and one or more audio reproduction devices connected or integrated into the infotainment unit. As an example, the infotainment unit 304 may execute an operation to render an audio player UI on the user interface 306 and a second operation to render audio content 308 through the one or more audio reproduction devices.

In an embodiment, the infotainment unit 304 may receive a user input to render the audio content 308. The audio content 308 may be one of an on-demand audio content, a live podcast, a pre-recorded podcast, or an audio of an on-demand or a live video program. In an embodiment, the audio content 308 may be titled "Podcast A" and may include a talk by a host or a conversation between the host and one or more persons, such as a cohost and/or a guest speaker. The infotainment unit 304 may be configured to transmit a request to the system 102. The system 102 may retrieve the audio content 308 from the server 110 based on the request and may control the media device 104 to play the retrieved audio content 308. In an embodiment, the system 102 may also retrieve a textual description or a metadata associated with the audio content 308 from the server 110. Details of the textual description are provided, for example, in FIG. 4B.

At any time-instant, the system 102 may detect the playback of the audio content 308 on the infotainment unit 304 of the vehicle 302. Based on the detection of the audio content 308, the system 102 may be configured to analyze a portion of the audio content 308. The portion of the audio content 308 may correspond to a specific duration (for example, an audio portion of two minutes length) and may be analyzed using the ML model 106. As discussed in FIG. 1, the ML model 106 may be a natural language processing model that may be pre-trained on a task of speech-to-text conversion, keyword detection, multi-speaker classification, and/or text classification. The analysis of the portion of the audio content 308 may include a conversion of the portion of the audio content 308 to a text and a determination of one or more keywords or key phrases associated with one or more items of interest from the text.

Based on the analysis of the audio portion, the system 102 may determine one or more items of interest that may be mentioned in the talk or the conversation. By way of example, and not limitation, the determined one or more items of interest may include at least one of an advertisement, a sponsored content, a product, a service, or a project that is mentioned may the talk or the conversation, a knowledge base article, an upcoming event or show, a focus or title of an upcoming episode of a podcast, a social network identifier, a website, and a concept that may be relevant to a topic of the talk or the conversation.

For example, if the audio content 308 includes a conversation between a guest (such as an actor "A") and a host, then the actor may promote his/her new movie ("XYZ") in the conversation. In the beginning of the conversation, the actor may mention his past work (such as past movies). Later on in the conversation, the actor may mention the name of the new movie (i.e. "XYZ") several times. The audio content 308 may even have a specific segment (such as a 5 minute talk) that may be dedicated to the new movie. The host may also mention the name of the new movie and details of the new movie (such as a story of the new movie, one or more members of a cast or crew of the movie, a genre of the new movie, a release date, one or more streaming services that may offer the new movie, and/or a resource that may be used to book or pay for watching the new movie). In some instances, the actor may use the opportunity to discuss other projects in his life. Also, the actor may talk about booking movie tickets of the new movie at a discounted price on a booking platform "B". At the end, the actor may also mention his social media profile where people may follow him and receive updates about his upcoming release "XYZ". In such a scenario, the determined one or more items of interest may include the sponsored content (i.e. previous movies of actor "A"), the social media identifier associated with a profile of actor "A" on social media "X", a website to book tickets of the upcoming movie at discounted prices, an advertisement about the one or more streaming services, other projects mentioned in the conversation, and the like.

Based on the determination of the one or more items of interest, the system 102 may extract information associated with the determined one or more items of interest from the web-based data source 108. By way of example, and not limitation, the extracted information associated with the one or more items of interest may include at least one of an identifier of each of the one or more items of interest, a URL of a page or a website associated with each of the one or more items of interest, a description of each of the one or more items of interest, a price, a promocode, or a discount applicable on the one or more items of interest, an event schedule associated with the one or more items of interest, or a social media profile or post associated with the one or more items of interest.

In accordance with an embodiment, the system 102 may be configured to generate a web crawler script to search the information associated with the one or more items of interest on the web-based data source 108. The generated web-crawler script may include computer-executable code that, when executed, may look up the web-based data source 108 for information (e.g., webpages, web feeds, or resources such as videos or images) associated with the with the one or more items of interest. The system 102 may be configured to execute the generated web crawler script and extract the information associated with the one or more items of interest based on the execution. In accordance with an embodiment, the web-crawler script, when executed, may invoke a web-scraper to extract the information associated with the one or more items of interest from the web-based data source 108.

The system 102 may be configured to generate one or more call-to-action (CTA) items 310 based on the extracted information. The generated one or more CTA items 310 may include a first CTA item 310A associated with a first item of interest of the determined one or more items of interest, a second CTA item 310B associated with a second item of interest of the determined one or more items of interest, and a third CTA item 310C associated with a third item of interest of the determined one or more items of interest. The system 102 may be configured to control the infotainment unit 304 to display the generated one or more CTA items 310 onto the user interface 306. Each of the generated one or more CTA items may be one of a widget or a notification associated with the determined one or more items of interest. In an embodiment, the generated one or more CTA items may be a real-time disappearing widget, an idle disappearing widget, an idle push notification, or an ignition off notification. The real-dime disappearing widget may be displayed on the user interface 306 of the infotainment unit 304 as soon as at least one item of interest is determined in the course of a playback of the audio content. For example, the idle disappearing widget and the idle push notification may be displayed when the vehicle 302 may be in an idle state. The ignition off notification may be displayed only when the engine of the vehicle 302 may be turned off.

In an embodiment, the system 102 may generate a note that includes a list of the one or more items of interest and the extracted information. The system 102 may determine a time to display the note on the user interface 306 of the infotainment unit 304 based on a safety parameter associated with the vehicle 302. Specifically, the safety parameter may be associated with the safety of the user inside the vehicle and may correspond to one of a parked state of the vehicle 302 or a state in which the vehicle is idling at a location (such as near a traffic light). In case the vehicle 302 is an autonomous or a semi-autonomous vehicle, the safety parameter may correspond to a state in which the vehicle 302 is moving, parked, or is idling at a location. The system 102 may control the infotainment unit 304 placed inside the vehicle 320 to display the generated note at the determined time. The safety parameter may need to be monitored because displaying the note at any time (e.g., when the user is driving) may divert the attention of the user from the road to the infotainment unit 304. This may be potentially unsafe for the user and other passengers of the vehicle 302. In accordance with an embodiment, the generated note may be displayed on a mobile device associated with the user. For example, the generated note may be included in an email that may be delivered at the determined time.

Figure 3B:
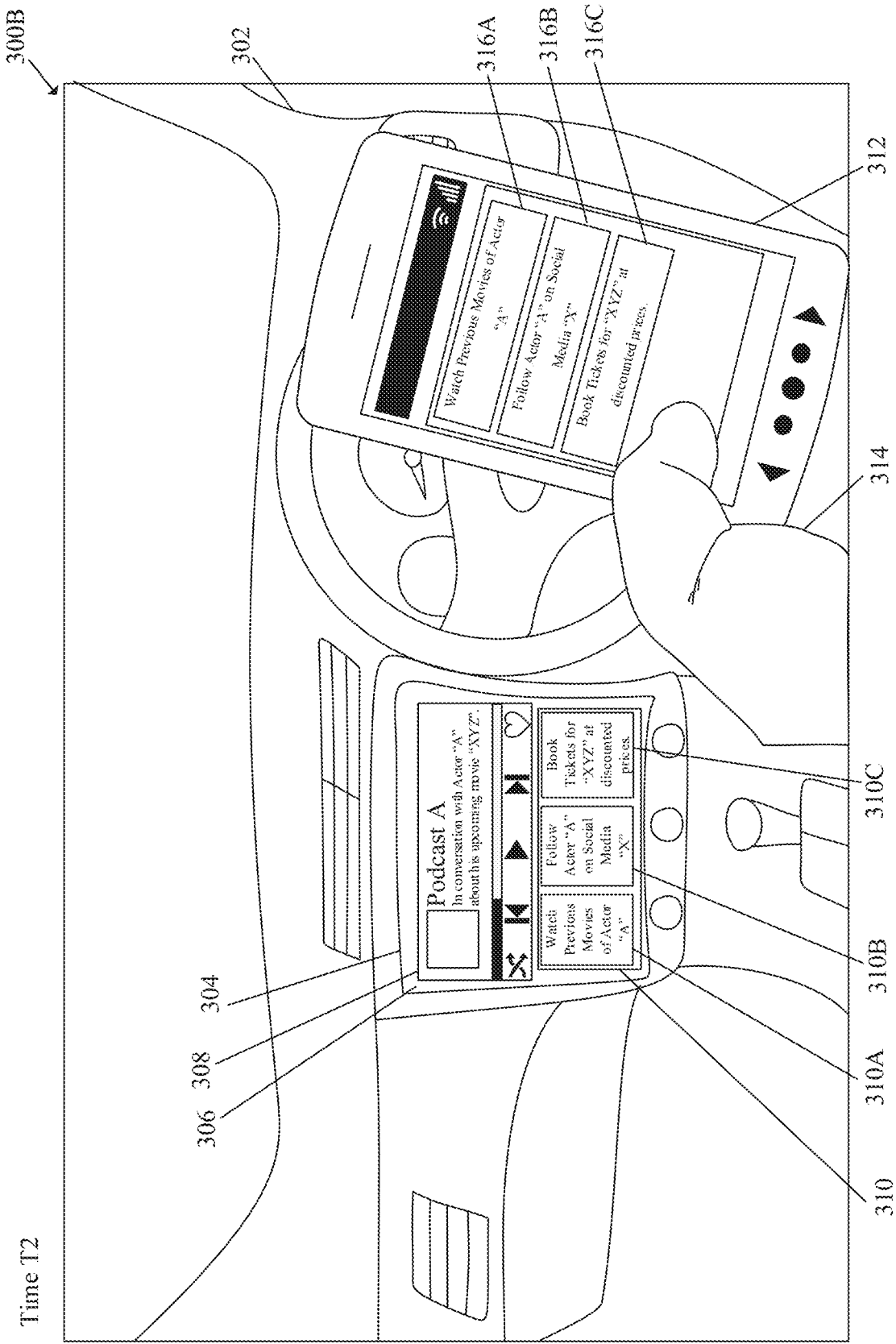
FIG. 3B is a diagram that illustrates an exemplary scenario for rendering of notes for items of interest on an electronic device of a user, in accordance with an embodiment of the disclosure.

FIG. 3B is a diagram that illustrates an exemplary scenario for rendering of notes for items of interest on an electronic device of a user, in accordance with an embodiment of the disclosure. FIG. 3B is explained in conjunction with elements from FIG. 1, FIG. 2, and FIG. 3A. With reference to FIG. 3B, there is shown an exemplary scenario 300B of the vehicle 302 that includes the infotainment unit 304, which may be an exemplary implementation of the media device 104. There is further shown an electronic device 312 of a user 314. The user 314 may be consuming the audio content 308 inside the vehicle 302.

The electronic device 312 may include suitable logic, circuitry, and interfaces that may be configured to render control a playback of the audio content 308. Examples of the electronic device 312 may include, but are not limited to, a smartphone, a cellular phone, a mobile phone, a computing device, a gaming device, a mainframe machine, a server, a computer work-station, and/or a consumer electronic (CE) device. In accordance with an embodiment, the media device 104 may be a display unit that may be integrated into the electronic device 312. In accordance with another embodiment, the electronic device 312 may be an exemplary implementation of the media device 104 and may be associated with the user 314 of the vehicle 302 or a consumer of the audio content in the vehicle 302.

Based on the extracted information associated with the one or more items of interest, the system 102 may be configured to render the generated one or more CTA items 310 on the electronic device 312 instead of the infotainment unit 304 of the vehicle 302. As discussed above, each of the one or more CTA items 310 may be associated with at least one of the one or more items of intertest and the corresponding extracted information. In another embodiment, the system 102 may be configured to render the generated one or more CTA items 310 on the electronic device 312 along with the infotainment unit 304 of the vehicle 302.

To render the generated one or more CTA items 310 on the electronic device 312, the system 102 may be configured to determine a capability of the electronic device 312 that may be associated with the user 314 who may be consuming the audio content 308 inside the vehicle 302. The capability of the electronic device 312 may be based on specifications of the electronic device 312. Specifically, the capability of the electronic device 312 may be associated with a computing or processing specification, a display specification, and an audio specification of the electronic device 312. Based on the determined capability of the electronic device 312, the system 102 may be configured to modify the one or more CTA items 310 to generate one or more modified CTA items 316. By way of example, and not limitation, the modification of the one or more CTA items 310 may correspond to at least one of a change in a font of the one or more CTA items 310, a change in a resolution of the one or more CTA items 310, a change in a shape of the one or more CTA items 310, a change of content of the one or more CTA items 310, and the like. The one or more modified CTA items 316 may include a first modified CTA item 316A, a second modified CTA item 316B, and a third modified CTA item 316C. The first modified CTA item 316A may be generated based on the modification of the first CTA item 310A. The second modified CTA item 316B may be generated based on the modification of the second CTA item 310B. Similarly, the third modified CTA item 316C may be generated based on the modification of the third CTA item 310C.

The system 102 may be further configured to transmit the generated one or more modified CTA items 316 to the electronic device 312 of the user 314. The electronic device 312 may receive the one or more modified CTA items 316 from the system 102 and may render the received one or more modified CTA items 316 onto the electronic device 312.

Figure 4A:
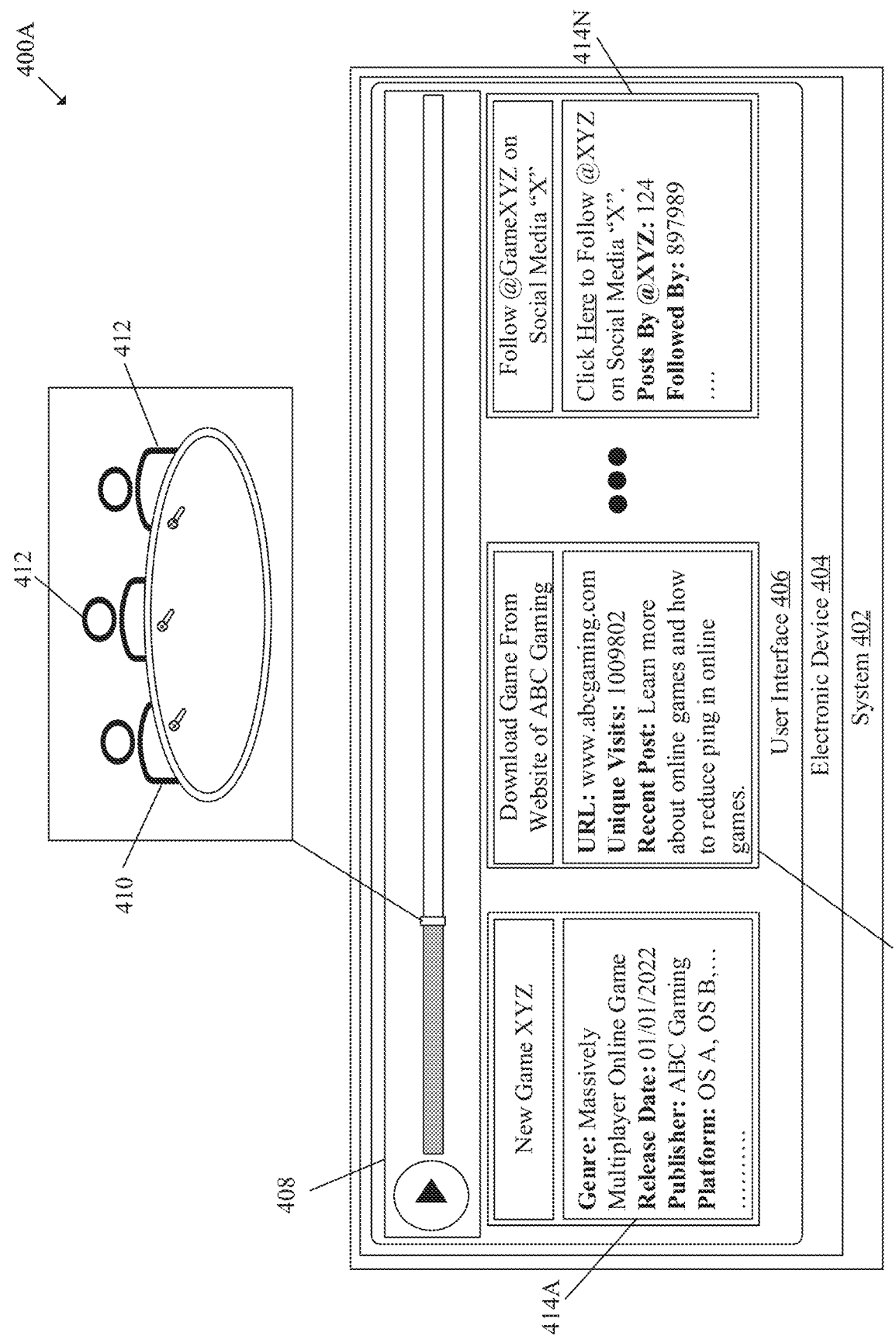
FIG. 4A is a diagram that illustrates an exemplary scenario for creation of notes for items of interest mentioned in audio content, in accordance with an embodiment of the disclosure.

FIG. 4A is a diagram that illustrates an exemplary scenario for creation of notes for items of interest mentioned in audio content, in accordance with an embodiment of the disclosure. FIG. 4A is explained in conjunction with elements from FIG. 1, FIG. 2, FIG. 3A, and FIG. 3B. With reference to FIG. 4A, there is shown an exemplary scenario 400A that includes a system 402. There is further shown an electronic device 404 that renders a user interface 406. The electronic device 404 may be an exemplary implementation of the media device 104 and may be associated with a user of the vehicle or a consumer of the audio content in the vehicle.

At any time-instant, the system 402 may detect a playback of audio content 408 on the electronic device 404. The audio content 408 may be one of an on-demand audio content, a live podcast, a pre-recorded podcast, or an audio of an on-demand or a live video program and may include a talk by a host 410 or a conversation between the host 410 and one or more persons 412. As a first example, the one or more persons 412 may be game developers (such as a first person 412A with name "A" and a second person 412B with name "B"), who may have created a new game and may join the conversation with the host to promote their new game. The conversation may be part of an episode of a game talk show that may be streamed as a podcast (i..e the audio content 408). The game developers may discuss many things about their new game and their work (e.g., past games, projects that are still in progress, or other ideas) in the conversation. The host 410 may play a demo of the game on the episode and the host 410 may describe a packaging of the game, mention the name of the game, the genre of the game, the game mechanics of the game, or may explain the salient-features of the gameplay. The game developers may talk about the release date, an early bird discount offer, and the website from where people may download the game after the release. The game developers may also provide social media identifiers for the game so that people may follow up with updates related to the new game.

Based on the detection of the playback, the system 402 may analyze a portion of the audio content 408 using the ML model 106. As discussed, the ML model 106 may be a natural language processing model that may be pre-trained on the task of keyword detection and text classification. The analysis of the portion of the audio content 408 includes a conversion of the portion of the audio content 408 to a text and a determination of one or more keywords or key phrases associated with the one or more items of interest from the text. The system 102 may be configured to determine one or more items of interest that may be mentioned in the talk or the conversation, based on such analysis. With reference to the first example, the determined one or more items of interest may include a first item of interest that may correspond to a product (i.e. the new game), a second item of interest that may correspond to a website from where the game may be downloaded, and an Nth item of interest that may correspond to a social media identifier of the game. In an embodiment, the determined one or more items of interest may also include a concept that may relevant to a topic of the talk or the conversation. With reference to first example, such concept may be a type of gameplay, such as an online cooperative gameplay.

The system 402 may be configured to extract information associated with the determined one or more items of interest from the web-based data source 108. The extracted information may include, for example, a metadata associated with the determined one or more items of interest, a description about the determined one or more items of interest, information associated with the social media identifiers, and the like.

With reference to FIG. 4A, the extracted information associated the first item of interest may include metadata associated with the product. Such metadata may include a name of the game, a genre of the game, a release date of the game, a publisher of the game, a name of one or more platforms which support the game, and the like. The extracted information associated with the second item of interest may include a URL of the website, a number of unique visits on the website, at least one recent post on the website, and the like. The extracted information associated with the Nth item of interest may include a social media profile associated with the social media identifier, a number of posts by the social media profile, a number of followers of the social media profile, and the like.

Based on the extracted information, the system 102 may be configured to control the electronic device 404 (i.e. a media device) to display the user interface 406 that includes the extracted information. In an embodiment, the system 102 may be configured to generate one or more first call-toaction (CTA) items 414 based on the extracted information. For example, the system 102 may be configured to generate a first CTA item 414A associated with the first item of interest. The system 102 may be configured to generate a second CTA item 414B associated with the second item of interest. Similarly, the system 102 may be configured to generate an Nth CTA item 414N associated with the Nth item of interest. The system 102 may be further configured to controls the electronic device 404 to display the first CTA item 414A, the second CTA item 414B, and the Nth CTA item 414N onto the user interface 406 of the electronic device 404.

Figure 4B:
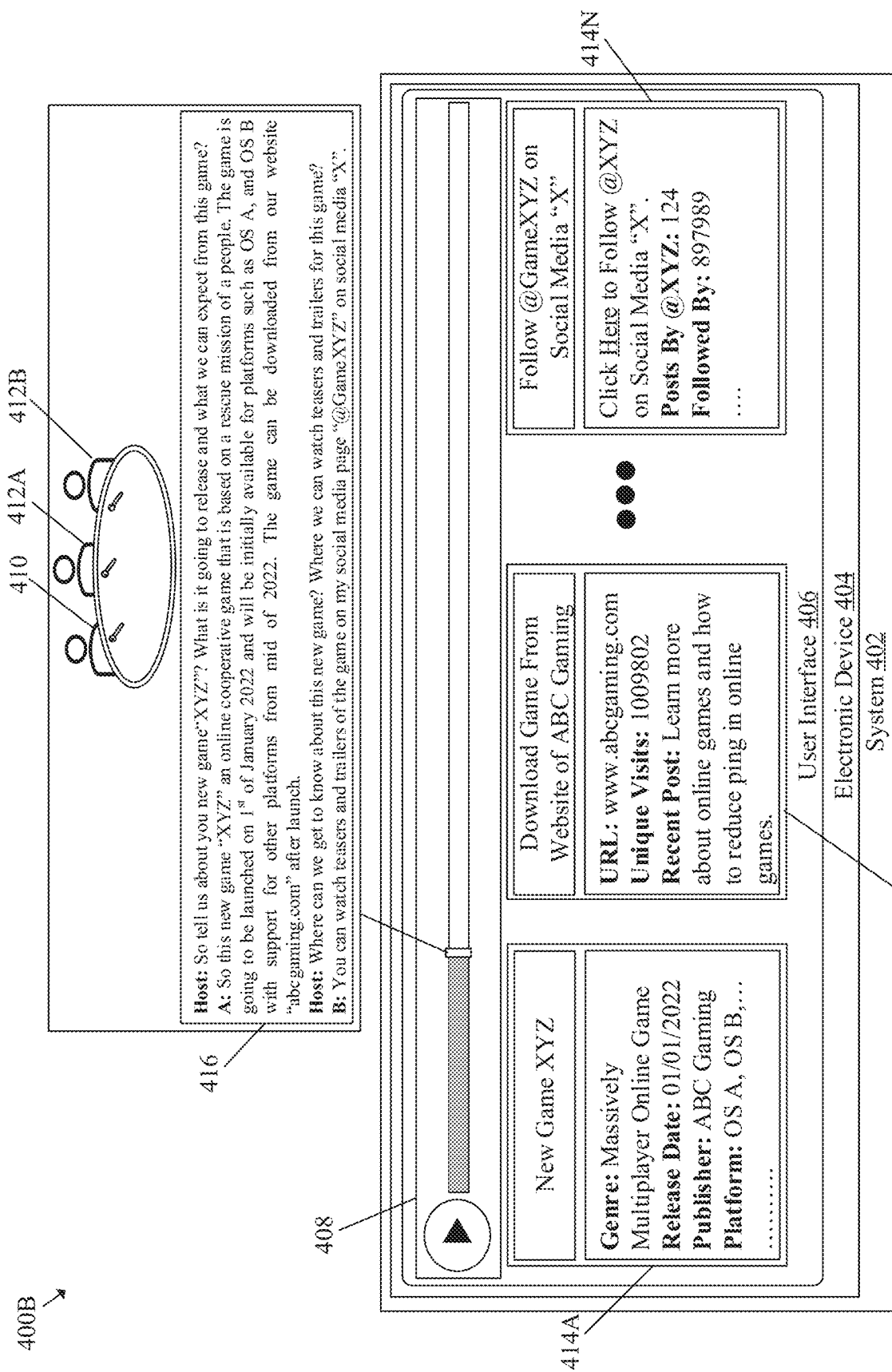
FIG. 4B is a diagram that illustrates an exemplary scenario for creation of notes for items of interest mentioned in textual description associated with audio content, in accordance with an embodiment of the disclosure.

FIG. 4B is a diagram that illustrates an exemplary scenario for creation of notes for items of interest that may be mentioned in a textual description associated with audio content, in accordance with an embodiment of the disclosure. FIG. 4B is explained in conjunction with elements from FIG. 1, FIG. 2, FIG. 3A, FIG. 3B, and FIG. 4A. With reference to FIG. 4B, there is shown an exemplary scenario 400B that includes the system 402. The system 402 may include the electronic device 404 that renders the user interface 406. There is further shown the audio content 408 and a textual description 416 associated with the audio content 408.

At any time-instant, the system 102 may detect a playback of the audio content 408 on the electronic device 404. The audio content may include a talk by the host 410 or a conversation between the host 410 and the one or more persons 412. Based on the detection of the playback, the system 102 may retrieve the textual description 416 associated with the audio content 408. In an embodiment, the textual description 416 may correspond to a transcript of the audio content 408. In another embodiment, the textual description may correspond to a brief description about the audio content 408 or a metadata associated with the audio content 408.

The system 102 may be configured to extract one or more keywords or key phrases based on an analysis of the determined textual description 416. In an embodiment, the analysis of the determined textual description 416 may be performed using the ML model 106. The ML model 106 may be pre-trained on a task of keyword detection and text classification and the analysis may include a determination of one or more keywords or key phrases associated with the one or more items of interest from the textual description 416.

The system 102 may be configured to determine the one or more items of interest based on the extracted one or more keywords. In an embodiment, the determined one or more items of interest may be extracted directly from the textual description 416. For example, the textual description 416 may include words like "new game XYZ", "Downloaded from our website abcgaming.com", "social media page @GameXYZ on social media X". These words included in the textual description 416 may be considered as the one or more item of interest. The system 102 may extract information associated with the determined one or more items of interest from the web-based data source 108 and may control the electronic device 404 to display the user interface 406 that includes the extracted information. Details about the extraction of the information are provided, for example, in FIG. 4A.

Figure 5:
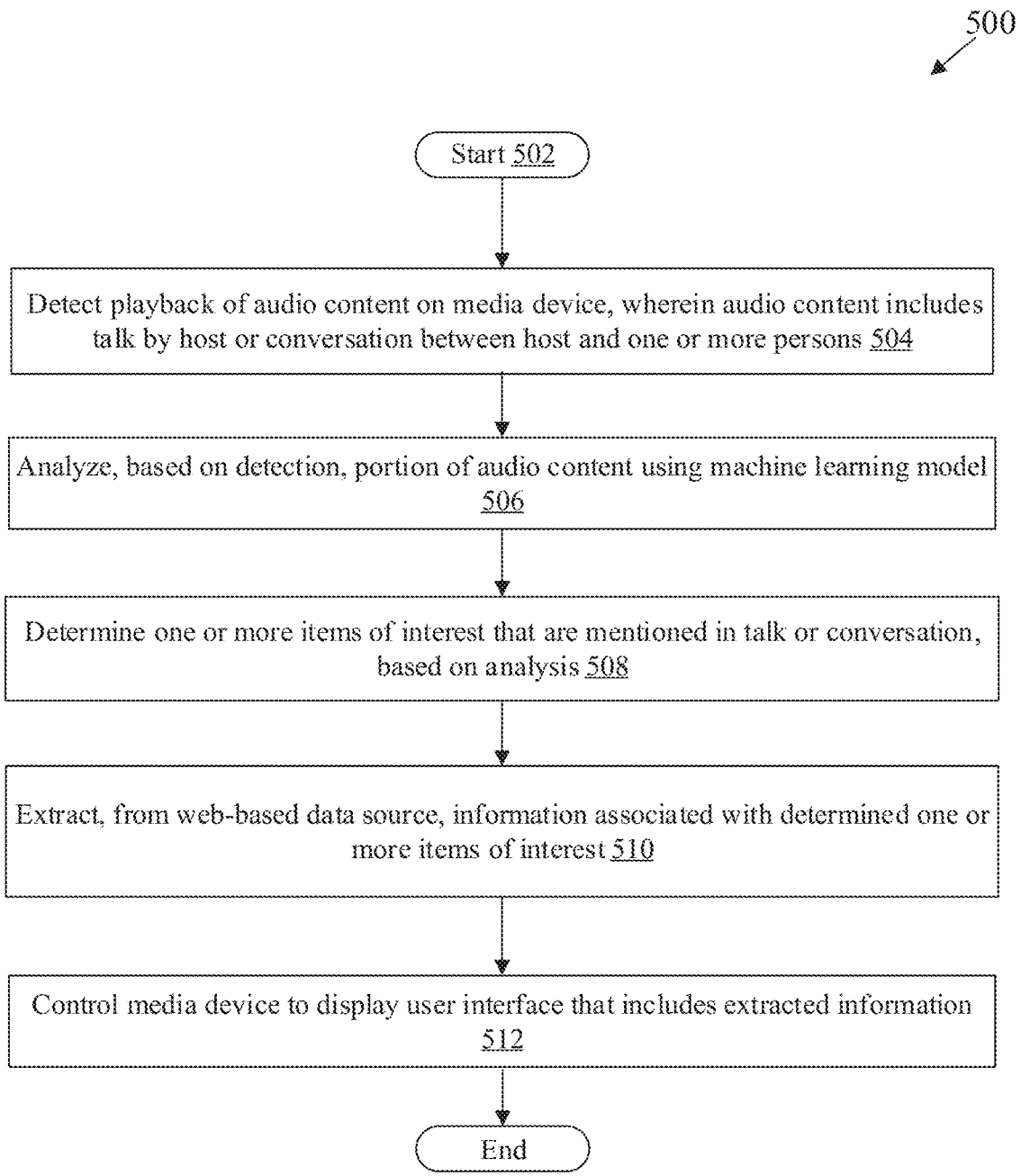
FIG. 5 is a flowchart that illustrates exemplary operations for creation of notes for items of interest mentioned in audio content, in accordance with an embodiment of the disclosure.

FIG. 5 is a flowchart that illustrates exemplary operations for creation of notes for items of interest mentioned in audio content, in accordance with an embodiment of the disclosure. With reference to FIG. 5, there is shown a flowchart 500. The flowchart 500 is described in conjunction with FIGS. 1, 2, 3A, 3B, 4A, and 4B. The operations from 502 to 512 may be implemented, for example, by the system 102 of FIG. 2 or the circuitry 202 of FIG. 2. The operations of the flowchart 500 may start at 502 and proceed to 504.

At 504, the playback of the audio content 308 may be detected on the media device 104. The audio content 308 may include the talk by the host or the conversation between the host and one or more persons. In accordance with an embodiment, the system 102 or the circuitry 202 may be configured to detect the playback of audio content 308 on the media device 104, wherein the audio content 308 includes the talk by the host or the conversation between the host and one or more persons. Details about the detection of the playback of the audio content 308 are provided, for example, in FIGS. 1, and 3A.

At 506, a portion of the audio content 308 may be analyzed using the ML model 106 based on the detection. In accordance with an embodiment, the system 102 or the circuitry 202 may be configured to analyze, based on the detection, the portion of the audio content 308 using the ML model 106. Details about the ML model 106 are provided, for example, in FIGS. 1 and 3A.

At 508, the one or more items of interest may be determined. The one or more items of interest may be mentioned in the talk or the conversation and may be determined based on the analysis. In accordance with an embodiment, the system 102 or the circuitry 202 may be configured to determine one or more items of interest that are mentioned in the talk or the conversation based on the analysis, as described, for example, in FIGS. 1, 3A, 4A and 4B.

At 510, information associated with the determined one or more items of interest may be extracted from the web-based data source 108. In accordance with an embodiment, the system 102 or the circuitry 202 may be configured to extract, from the web-based data source 108, information associated with the determined one or more items of interest. Details about the extraction of the information are provided, for example, in FIGS. 1, 3A, and 4A.

At 512, the media device 104 may be controlled to display the user interface 114 that includes the extracted information. In accordance with an embodiment, the system 102 or the circuitry 202 may be configured to control the media device 104 to display the user interface 114 that includes the extracted information. Details about the user interface are provided, for example, in FIG. 3A, 3B, 4A, and 4B.

Although the flowchart 500 is illustrated as discrete operations, such as 504, 506, 508, 510, and 512, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (such as the system 102) for creation of notes for items of interest mentioned in audio content. The set of instructions may be executable by the machine and/or the computer to perform operations that may include determination of the playback of audio content (such as the audio content 308) on a media device (such as the media device 104). The audio content includes the talk by a host (such as the host 410) or a conversation between the host and one or more persons (such as the one or more persons 412). The operations may further include analyzing the portion of the audio content using a machine learning model (such as the ML model 106) based on the detection. The operations may further include determining one or more items of interest that are mentioned in the talk or the conversation based on analysis. The operations may further include extracting information associated with the determined one or more items of interest from a web-based data source (such as the web-based data source 108). The operations may further include controlling the media device to display a user interface (such as the user interface 114) that includes the extracted information.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A system, comprising:
    circuitry which:
        detects a playback of audio content on a media device placed inside a vehicle, wherein the audio content includes a talk by a host or a conversation between the host and one or more persons;
        analyzes, based on the detection, a portion of the audio content using a machine learning model;
        determines a plurality of items of interest that are mentioned in the talk or the conversation, based on the analysis;
        extracts, from a web-based data source, information associated with each of the determined plurality of items of interest;
        generates a first call-to-action (CTA) item based on the extracted information associated with a first item of the determined plurality of items of interest;
        generates a note that includes a list of the determined plurality of items of interest and the extracted information;
        determines a time to display the note, based on a safety parameter that corresponds to one of a parked state of the vehicle or an idling state of the vehicle;
        controls the media device to display a user interface at the determined time, wherein the user interface displays the note that includes the determined plurality of items of interest and the extracted information associated with each of the determined plurality of items of interest;
        determines a display specification of an electronic device that is associated with a user consuming the audio content inside the vehicle, wherein the electronic device is different from the media device; and
        modifies the generated first CTA item based on the determined display specification of the electronic device.

2. The system according to claim 1, wherein the media device is an infotainment unit of the vehicle.

3. The system according to claim 1, wherein the audio content is one of an on-demand audio content, a live podcast, a pre-recorded podcast, or an audio of an on-demand or a live video program.

4. The system according to claim 1, wherein the determined plurality of items of interest comprise at least one of:
    an advertisement,
    a sponsored content,
    a product, a service, or a project that is mentioned in the talk or the conversation,
    a knowledge base article,
    an upcoming event or show,
    a focus or title of an upcoming episode of a podcast,
    a social network identifier,
    a website, or
    a concept that is relevant to a topic of the talk or the conversation.

5. The system according to claim 1, wherein the circuitry further:
    determines a textual description associated with the audio content;
    extracts one or more keywords or key phrases based on an analysis of the determined textual description; and
    determines the plurality of items of interest based on the extracted one or more keywords.

6. The system according to claim 5, wherein the determined plurality of items of interest are extracted from the textual description.

7. The system according to claim 1,
    wherein the machine learning model is a natural language processing model that is pre-trained on a task of keyword detection and text classification, and
    wherein the analysis of the portion of the audio content includes:
        a conversion of the portion of the audio content to a text, and
        a determination of one or more keywords or key phrases associated with the plurality of items of interest from the text.

8. The system according to claim 1, wherein the extracted information associated with the plurality of items of interest includes at least one of:
    an identifier of each of the plurality of items of interest,
    a URL of a page or a website associated with each of the plurality of items of interest,
    a description of each of the plurality of items of interest, a price, a promocode, or a discount applicable on the plurality of items of interest, an event schedule associated with the plurality of items of interest, or a social media profile or post associated with the plurality of items of interest.

9. The system according to claim 1, wherein the circuitry further:

executes a web crawler script to search for the information associated with the plurality of items of interest on the web-based data source; and extracts the information based on the execution.

10. The system according to claim 1, wherein the circuitry further:

generates a second CTA item based on the modification; and transmits the generated second CTA item to the electronic device.

11. The system according to claim 1, wherein the generated first CTA item is one of a widget or a notification associated with the first item of the plurality of items of interest.

12. The system according to claim 1, wherein the vehicle is an autonomous vehicle or a semi-autonomous vehicle, and wherein the safety parameter corresponds to one of the parked state of the vehicle or a state in which the vehicle is idling at a location or a state where the vehicle is moving.

13. A method, comprising:

detecting a playback of audio content on a media device placed inside a vehicle, wherein the audio content includes a talk by a host or a conversation between the host and one or more persons;

analyzing, based on the detection, a portion of the audio content using a machine learning model;

determining a plurality of items of interest that are mentioned in the talk or the conversation, based on the analysis;

extracting, from a web-based data source, information associated with each of the determined plurality of items of interest;

generating a first call-to-action (CTA) item based on the extracted information associated with a first item of the determined plurality of items of interest;

generating a note that includes a list of the determined plurality of items of interest and the extracted information;

determining a time to display the note, based on a safety parameter that corresponds to one of a parked state of the vehicle or an idling state of the vehicle;

controlling the media device to display a user interface at the determined time, wherein the user interface displays the note that includes the determined plurality of items of interest and the extracted information associated with each of the determined plurality of items of interest;

determining a display specification of an electronic device that is associated with a user consuming the audio content inside the vehicle, wherein the electronic device is different from the media device; and modifying the generated first CTA item based on the determined display specification of the electronic device.

14. The method according to claim 13, wherein the media device is an infotainment unit of the vehicle.

15. The method according to claim 13, wherein the audio content is one of an on-demand audio content, a live podcast, a pre-recorded podcast, or an audio of an on-demand or a live video program.

16. The method according to claim 13, wherein the determined plurality of items of interest comprise at least one of:

an advertisement, a sponsored content, a product, a service, or a project that is mentioned in the talk or the conversation, a knowledge base article, an upcoming event or show, a focus or title of an upcoming episode of a podcast, a social network identifier, a website, or a concept that is relevant to a topic of the talk or the conversation.

17. A non-transitory computer-readable storage medium configured to store instructions that, in response to being executed, cause a system to perform operations, the operations comprising:

detecting a playback of audio content on a media device placed inside a vehicle, wherein the audio content includes a talk by a host or a conversation between the host and one or more persons;

analyzing, based on the detection, a portion of the audio content using a machine learning model;

determining a plurality of items of interest that are mentioned in the talk or the conversation, based on the analysis;

extracting, from a web-based data source, information associated with each of the determined plurality of items of interest;

generating a first call-to-action (CTA) item based on the extracted information associated with a first item of the determined plurality of items of interest;

generating a note that includes a list of the determined plurality of items of interest and the extracted information;

determining a time to display the note, based on a safety parameter that corresponds to one of a parked state of the vehicle or an idling state of the vehicle;

controlling the media device to display a user interface at the determined time, wherein the user interface displays the note that includes the determined plurality of items of interest and the extracted information associated with each of the determined plurality of items of interest;

determining a display specification of an electronic device that is associated with a user consuming the audio content inside the vehicle, wherein the electronic device is different from the media device; and modifying the generated first CTA item based on the determined display specification of the electronic device.

* * * * *